United States Patent [19]

Riew et al.

[11] Patent Number: 4,883,841

[45] Date of Patent: Nov. 28, 1989

[54] POLYCARBONATE COMPOSITIONS HAVING MULTIPLE PHASE IMPACT MODIFIERS THEREIN

[75] Inventors: Changkiu K. Riew, Akron; Roger E. Morris, Cuyahoga Falls, both of Ohio

[73] Assignee: The B.F. Goodrich Company, Akron, Ohio

[21] Appl. No.: 253,527

[22] Filed: Oct. 5, 1988

[51] Int. Cl.[4] .............................................. C08L 69/00
[52] U.S. Cl. ..................................... 525/148; 525/146
[58] Field of Search ................. 525/148, 146, 468, 902

[56] References Cited

U.S. PATENT DOCUMENTS

| | | | |
|---|---|---|---|
| 3,251,904 | 5/1966 | Souder et al. | 260/876 |
| 3,655,825 | 4/1972 | Souder | 260/876 R |
| 3,668,274 | 6/1972 | Owens et al. | 260/857 G |
| 3,793,402 | 2/1974 | Owens | 260/876 R |
| 3,808,180 | 4/1974 | Owens | 260/885 |
| 3,843,753 | 10/1974 | Owens | 260/876 R |
| 3,859,384 | 1/1975 | Carty | 260/876 R |
| 3,859,389 | 1/1975 | Carty | 260/885 |
| 3,984,497 | 10/1976 | Owens et al. | 260/879 |
| 4,086,296 | 4/1978 | Carty et al. | 260/857 G |
| 4,096,202 | 6/1978 | Farnham et al. | 260/873 |
| 4,173,596 | 11/1979 | DeWitt | 428/402 |
| 4,299,928 | 11/1981 | Witman | 525/67 |
| 4,378,449 | 3/1983 | Witman | 526/67 |
| 4,473,679 | 9/1984 | Falk | 524/432 |

*Primary Examiner*—Theodore E. Pertilla
*Attorney, Agent, or Firm*—James R. Lindsay; Daniel J. Hudak

[57] ABSTRACT

Polycarbonates are blended with an impact modifier to improve the impact resistance thereof. The impact modifier is a multiple phase polymer system prepared by subsequent multiple stage polymerizations. The first phase which constitutes from about 50 percent to about 90 percent by weight of the multiple phase impact modifier is generally an elastomer such as an alkyl acrylate wherein the alkyl portion has from 2 to 18 carbon atoms. The second phase polymer is generally a plastic type compound such as a vinyl substituted aromatic, an alkyl methacrylate, or an alkenyl nitrile compound. The impact modifiers are made without utilizing any crosslinking or grafting agents and thus are substantially free of any such bonds and are generally free-flowing powders.

15 Claims, No Drawings ular weight such as in excess of 100,000 and a subsequently

POLYCARBONATE COMPOSITIONS HAVING MULTIPLE PHASE IMPACT MODIFIERS THEREIN

FIELD OF THE INVENTION

The present invention relates to the utilization of a multiple phase impact modifier for polycarbonates comprising an elastomeric phase made from a 2 to an 18 carbon atom alkyl acrylate having a high molecular weight such as in excess of 100,000 and a subsequently polymerized plastic phase.

BACKGROUND

Polycarbonate generally has poor impact resistance for thickness in excess of $\frac{1}{8}$ to about $\frac{1}{2}$ inch. The thickness effect can be explained by considering the stress state as behind a notch. In thin samples, the material behind the notch is subject to plain stress and can participate freely in shear, resulting in great toughness. In thick samples, the material behind the notch exhibits plain strain, inhibiting the outset of shear deformation but facilitating the onset of crazing; this results in brittle behavior. Heretofore, impact modifiers which were utilized to improve the impact resistance of polycarbonate included compounds such as butadiene-styrene copolymers which were coated with a copolymer made from styrene, methyl methacrylate, acrylonitrile, or butyl acrylate which was coated with methyl methacrylate, and the like.

A number of patents exist with regard to impact modifiers for various polymers and include the following:

U.S. Pat. No, 3,251,904 to Souder, et. al., relates to solid, thermoplastic, polymeric products from the sequential polymerization of alkyl methacrylates with polyalkyl acrylates and to high impact resistance materials resulting from blends of such products with other polymeric materials, especially polyvinyl chloride.

U.S. Pat. No. 3,655,825 to Souder, et. al., relates to solid, thermoplastic, polymeric products resulting from the polymerization of lower alkyl esters of acrylic and methacrylic acid and to high impact-resistant materials which result from blends of such products and other polymeric materials, particularly polymers and copolymers of vinyl chloride. Crosslinking monomers are utilized.

U.S. Pat. No. 3,793,402 to Owens relates to an impact resistant thermoformable composition having improved stress whitening behavior comprising a blend of a thermoplastic polymer and a multi-stage, sequentially produced polymer characterized by a non-elastomeric hard stage, an intermediate elastomeric stage, and a relatively hard stage.

U.S. Pat. Nos. 3,808,180 and 3,843,753 to Owens relates to rigid thermoplastics such as acrylic polymers and vinyl halide polymers which are modified to impart high impact resistance.

U.S. Pat. Nos. 3,859,384 and 3,859,389 to Carty, et. al., relate to acrylic modifiers for vinyl halide polymers having superior mill roll release at high temperature and resistance to "plate out," obtained by modifying the polymers with a multi-phase based acrylic composite polymer having a first non-crosslinked phase and a final, rigid thermoplastic phase polymerized in the presence of the first phase.

U.S. Pat. No. 4,086,296 to Carty, et. al., relates to blends of thermoplastic polymers and a multi-phase acrylic composite polymer comprising a non-crosslinked phase, and a final rigid thermoplastic phase polymerized in the presence of said first phase. The core polymer has a very low molecular weight, that is less than 50,000, and contained no suggestions of imparting improved impact resistance.

U.S. Pat. No. 4,096,202 to Farnham, et. al., relates to a blend of a polyester and an impact modifier which is a multi-phase composite interpolymer comprising a crosslinked acrylic first stage and a final rigid thermoplastic stage.

U.S. Pat. Nos. 4,299,928 and 4,378,449 to Witman relate to polycarbonates having improved impact performance comprising a blend of a polycarbonate resin and a $C_1$ to $C_6$ acrylic rubber interpolymer composite. These patents also utilize a crosslinker as well as a graft linker to bond the various phases or shell and core together.

SUMMARY OF THE INVENTION

Polycarbonates containing aromatic or aliphatic portions, or mixtures thereof, are toughened with a multiple phase impact modifier. Inasmuch as a major portion or phase of the multiple phase impact modifier is elastomeric and non-free flowing at ambient temperatures, it is rendered free flowing by utilizing a plastic phase polymer therewith. Such multiple phase impact modifiers are generally made by initially forming an elastomer and subsequently, for example, sequentially forming a plastic polymer in the presence of the elastomer. The elastomer generally has a low Tg as below 10° C. whereas the plastic polymer generally has a high glass transition temperature of at least 10° C. Particle size of the multiple phase impact modifiers are important with regard to improved properties such as impact and/or crack resistance, solvent resistance, and the like. The polymerized multi-phase impact modifiers of the present invention have been found to have unexpectedly good impact values inasmuch as no crosslinking agents or graft linking agents have been utilized.

DETAILED DESCRIPTION OF THE INVENTION

The polycarbonates which can be utilized in the present invention are generally characterized by the —OCOO—hetero chain unit and are well known to the art and to the literature. Generally any type of polycarbonate can be utilized. The polycarbonates can be made from aromatic monomers, aliphatic monomers, or mixtures thereof. Examples of such polycarbonates are set forth in the *Encyclopedia of Polymer Science and Engineering*, Volume 11, page 648–718, D. Freitag et al, John Wiley & Sons, 1988. Although aliphatic polycarbonates can be utilized, they are generally less important than aromatic polycarbonates. Various starting materials for aliphatic polycarbonates are diols and carbonates, as for example diethyl or diphenyl carbonate. Aromatic polycarbonates are generally prepared by the reaction of bisphenols with carbonic acid derivatives. The bisphenol is generally bisphenol A, that is 2,2-(4,4'-dihydroxyphenyl) propane. The carbonic acid derivative can be phosgene or diphenyl carbonate. The aromatic polycarbonates are generally preferred. The molecular weight of the various polycarbonates is generally from about 20,000 to about 200,000 and desirably from about 22,000 to about 32,000.

The impact modifiers of the present invention have good thermal stability and good chemical aging resistance. The initially polymerized polymer of the multiple phase impact modifier of the present invention has a low glass transition temperature as about 0° C. or less and preferably less than minus 20° C. Examples of monomers utilized to make the initial elastomer phase are various alkyl acrylates having the formula

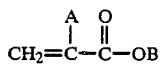

where A is hydrogen or an alkyl having from 1 to 3 carbon atoms and B is an alkyl having from 1 to 18 carbon atoms and preferably from 2 to 12 carbon atoms. Examples of specific compounds include ethyl acrylate, butyl acrylate, pentyl acrylate, 2-ethylhexyl acrylate, octyl acrylate, stearyl acrylate, lauryl acrylate, and the like, with 2-ethylhexyl acrylate being highly preferred. Optionally, elastomer forming comonomers can be utilized as from about 0 to about 25 percent by weight and preferably from about 0 to about 15 percent by weight, based upon the total amount of the elastic polymer forming monomers, such as styrene, acrylonitrile, and the like. One or more such polymers or copolymers can be utilized. The elastomers of the present invention have a high molecular weight as from about 100,000 to about 7,000,000, and preferably from about 200,000 to about 5,000,000.

The multiple phase impact modifier of the present invention, as noted above, is the end result of polymerization of different types of monomers. Accordingly, two, three or more different types of polymerization systems can be utilized. The impact modifiers of the present invention are made from at least two separate and distinct polymerization phases such as a first phase and a second phase in a subsequent manner and preferably in a sequential manner. A variety of end products can thus be formulated. Although it is not fully understood, it is believed that a typical end product of the sequential multiple phase polymerization of the present invention results in an elastomer being a core polymer with the plastic polymer substantially forming a shell or encapsulating the core. If a third polymer system is utilized, it can form an overcoat or substantially encapsulate or cover the shell. However, it is to be understood that many other geometric or structural arrangements can exist. The amount of the elastomer is generally from about 50 percent to about 95 percent by weight and preferably from about 60 percent to about 90 percent by weight based upon the total weight of the impact modifier.

The plastic polymer is generally a non-tacky, free flowing polymer having a glass transition temperature of at least 10° C., desirably at least 30° C., and preferably at least 50° C. or greater. As noted above, the plastic polymer is subsequently polymerized after polymerization of the elastomer to form the multiple phase impact modifier of the present invention. Such plastic polymer should have a sufficient hardness to impart free flowing properties to the impact modifier.

It is noted that the plastic polymer forming monomers as well as the elastomer polymer forming monomers are free from and do not contain any crosslinking or grafting agents since none are added thereto. While no crosslinking or graft linking agents are added to the compositions of this invention, it may be that some crosslinking and grafting might occur dependent upon the elastic or plastic phase monomers and/or polymerization conditions. The total amount of such inadvertent internal grafting or crosslinking will be less than when crosslinking agents are deliberately added to the compositions. It has unexpectedly been found that the non-use of any chemical crosslinking or grafting agents actually produces a composition having improved properties with regard to impact resistance, crack resistance solvent resistance, and the like.

Various monomers and desirably comonomers can be utilized to form the plastic polymer. Such monomers include the various alkyl methacrylates wherein the alkyl portion has from 1 to 4 carbon atoms, with specific examples including methyl methacrylate, butyl methacrylate, t-butyl methacrylate, propyl methacrylate, etc., and the like, with methyl methacrylate being preferred. Another group of monomers are the various vinyl substituted aromatics having from 8 to about 12 carbon atoms and preferably from 8 to 10 carbon atoms with specific examples including styrene, styrene with ring substituted methyl or chloro groups, alpha-methyl styrene, and the like with styrene and alpha methyl styrene being preferred. Another group of plastic-forming monomer is an alkenyl compound such as acrylonitrile or methacrylonitrile. Desirably, copolymers of the above monomers are utilized to form the plastic polymer with specific examples including the copolymers made from styrene-acrylonitrile, styrene-methyl methacrylate-acrylonitrile, methyl methacrylate-acrylonitrile, styrene-methyl methacrylate, and the like.

Often times it is desirable to utilize small amounts of so-called property improving comonomers which improve the property of the plastic or second stage polymer with regard to compatibility, hardness, and the like. Such optional, but desirable comonomers are utilized in an amount of less than 50 percent by weight and desirably from about 2 percent to about 30 percent by weight based upon the total weight of said property-improving comonomers and the above-noted plastic-type forming monomers. Such property improving comonomers may contain acid, hydroxyl or epoxy groups, with specific examples of such types including alkyl acrylates or alkoxy substituted alkyl acrylates having a total of from 1 to 8 carbon atoms such as hydroxyethyl acrylate, hydroxyethyl methacrylate, ethoxyethyl-ethoxyethyl methacrylate, ethoxyethyl acrylate, ethyl acrylate, methyl acrylate, butyl acrylate, octyl acrylate, and the like. Other type of property improving comonomers include the various mono-vinyl esters having from 1 to 12 carbon atoms, alkylacrylamides having from 1 to 12 carbon atoms, vinyl ethers having from 1 to 12 carbon atoms, aryl acrylates and methacrylates having from 6 to 16 carbon atoms, and the like. Examples of such property improving comonomer with the above-noted plastic forming monomers include glycidyl methacrylate, tetrahydrofurfuryl methacrylate, methoxy ethyl acrylate, ethyl acrylate, and the like.

The amount of the plastic polymer is from about 5 percent to about 50 percent, and preferably from about 10 percent to about 40 percent by weight based upon the total weight of the multiple phase impact modifier.

The particle size of the impact modifier is important since it effects the physical properties produced when utilized in association with the above-noted polycarbonates. Generally, the multiple phase impact modifiers of the present invention have a particle size of between about 30 and about 400 nanometers and preferably between about 50 and about 300 nanometers. The amount of impact modifier utilized per 100 parts by weight of the polycarbonate is from about 1 to about 30 parts by weight and preferably from about 2 to about 10 parts by weight.

The polymerization of the elastomer polymer forming monomers as well as the plastic polymer forming monomers of the present invention can generally be carried out according to any conventional process. However, emulsion polymerization is typically preferred inasmuch as suspension polymerization tends to yield particles which are too large.

The multiple phase impact modifiers of the present invention are prepared by solution, suspension or emulsion polymerization procedures utilizing a subsequent multiple stage technique. In simplest form, the first or elastomeric phase is formed and the hard plastic phase is formed as a second or subsequent phase. The monomers of the initial phase, together with polymerization initiators, soap or emulsifiers polymerization modifiers and chain transfer agents and the like are mixed and polymerized, e.g., by heating and mixing the emulsion, in any well known or conventional fashion, until the monomers are substantially depleted and a first phase polymer is formed. Monomers of the second, and each subsequent additional phase, are then separately added with appropriate additives, e.g., supplementary initiators, soap, modifiers, and the like, so that the desired polymerization of each phase subsequently occurs until substantial exhaustion of the monomers for each phase. In each phase subsequent to the preceding, the amounts of the initiators and soap, if any, are maintained at a level such that polymerization occurs at or near the surface of the existing particles, and no substantial number of new particles, or seeds, are formed in the emulsion. During formation of each phase, the monomer composition can be varied or changed during the polymerization of a particular phase. The elastomeric phase or polymer as noted is generally soft and tacky whereas the second or plastic phase is generally hard and non-tacky and hence is free-flowing. As noted above, it is an important aspect of the present invention that the elastic phase, as well as the plastic phase, are non-cross-linked. That is, there are no crosslinking or graft-linking monomers which have been added with the intent that they function as crosslinking and/or graftlinking monomers.

The polymerization reactions can be initiated by free radical initiator systems. Examples of such initiators include the organic peroxides, such as benzoyl peroxide, substituted benzoyl peroxides, acetyl peroxides, lauryl peroxide, t-butyl hydroperoxide, di-t-butyl peroxide, peresters, such as t-butyl peroxypivalate, azo-type initiators such as azo-bis-isobutyronitrile, persulfates, such as sodium, potassium or ammonium persulfate, and peroxyphosphates such as sodium, potassium, or ammonium peroxyphosphate. Redox initiators are generally a combination of a hydroperoxide, such as hydrogen peroxide, t-butyl-hydroperoxide, cumene hydroperoxide, di-isopropylbenzene hydroperoxide, and the like, with a reducing agent, such as sodium, potassium, or ammonium bisulfite, metabisulfite, or hydrosulfite, sulfur dioxide, hydrazine, ferrous salts, ascorbic acid, sodium formaldehyde sulfoxylate and the like, as are well known in the art.

Examples of emulsifiers or soaps suited to polymerization processes of the present invention include alkali metal and ammonium salts of alkyl, aryl, alkaryl, and aralkyl sulfonates; sulfates; polyether sulfates; fatty acids; complex organophosphoric acids; as well as ethoxylated derivatives of fatty acids, esters, alcohols, amines, amides and alkyl phenols.

The compositions of the present invention can be processed as by extrusion and more desirably as by injection molding. Suitable uses of the compositions of the present invention includes electrical applications, household and consumer articles such as kitchen sinks, automotive applications such as light coverings, radiator grills, photographic and optical equipment such as camera and binocular housings, construction such as industrial and greenhouse windows, and the like.

The invention will be better understood by reference to the following examples.

EXAMPLE 1

A six liter jacketed resin flask with a four neck head was fitted with a reflux condenser, stirrer, thermocouple, dip tube and temperature controller. After thorough purging with nitrogen, the reactor was charged with solution A and the contents were heated to 68° C. A portion of Nitrogen Purged Premix #1 (106 g.) was pumped into the reactor rapidly using a laboratory piston type pump. Purged Solution B was then forced in under Nitrogen pressure. The remainder of Premix #1 was pumped in over a period of about 3.5 hours. After a 30 minute delay, oxygen-free Premix #2 was pumped in over a period of about two hours. Reaction temperature was held at 70° C. under a positive nitrogen pressure. Conversion of monomer to polymer was greater than 96 percent in both stages.

| SOLUTION A: | |
|---|---|
| Sodium Lauryl Sulfate (10%) | 42 g. |
| Distilled Water | 942 g. |
| Sodium Sulfate | 3.92 g. |
| SOLUTION B: | |
| Sodium Persulfate | 2.8 g. |
| Distilled Water | 140.0 g. |
| Premix #1 | |
| Distilled Water | 1050.3 g. |
| Sodium Lauryl Sulfate (10%) | 225.4 g. |
| 2-Ethylhexyl Acrylate | 1820.0 g. |
| Premix #2 | |
| Sodium Lauryl Sulfate (10%) | 96.6 g. |
| Distilled Water | 610.1 g. |
| Methyl Methacrylate | 882.0 g. |
| Ethyl Acrylate | 98.0 g. |

The product was isolated by freeze coagulation, washed and dried. Notched Izod values are given in Table I.

Samples were also prepared by overpolymerization of a hard phase on Latex A prepared at 35° C. in a 15-gallon reactor using the following recipe and conducted in a manner similar to the first stage of Example 1.

| Core Rubber Preparation: (Latex A)(for Example 2-5) | |
|---|---|
| | PHM |
| Reactor Charge (materials given in active parts): | |
| Soft Water | 65 |
| Sodium Lauryl Sulfate | 0.8 |
| Sodium Sulfate | 0.1 |
| Solution C | |
| Sequestrene NaFe | 0.008 |
| Sequestrene Na3T | 0.004 |
| Sodium Formaldehyde Sulfoxylate | 0.056 |
| Soft Water | 1.0 |
| Additive D | |

| Reactor Charge (all three polymerizations): | | | |
|---|---|---|---|
| Latex (total solids = 41.91%) | | | |
| Latex solids = 1719.9 g | | 4103.8 g | |
| Distilled Water | | 529 g | |
| | EXAMPLE 3 | EXAMPLE 4 | EXAMPLE 5 |
| Monomer Solution: | | | |
| Styrene | 685.3 g | 231.5 g | 629.8 g |
| Acrylonitrile | 240.8 g | none | 148.2 g |
| Methyl Methacrylate | none | 694.6 g | 148.2 g |
| t-Dodecyl mercaptan | 1.39 g | 1.39 g | 1.39 g |
| Soap Solution: | | | |
| Distilled Water | 557.7 g | same | same |
| Sodium Lauryl Sulfate | 20.51 g | same | same |
| Solution A: | | | |
| Sodium Persulfate | 1.85 g | same | same |
| Water | 185.5 g | same | same |

| Core Rubber Preparation: (Latex A)(for Example 2-5) | |
|---|---|
| | PHM |
| Cumene Hydroperoxide | 0.0616 |
| Monomer Premix | |
| Sodium Lauryl Sulfate | 0.5 |
| Soft Water | 70 |
| 2-ethylhexyl acrylate | 100 |

Reactor charge was heated to 30° C. and 8 percent of Premix #1 was added. Solution C was added quickly followed by Additive D. The temperature rose to 35° C. and was maintained there. Remaining Premix #1 was added over a period of five hours. After one additional hour, the charge was cooled, filtered, and stored for use in Examples 2 through 5.

EXAMPLE 2

A portion of Latex A was deaerated and charged to a 6-liter reactor along with deaerated water and a second phase polymerization was carried out in a manner very similar to the second phase polymerization in Example 1 using the following recipe:

| Reactor Charge | |
|---|---|
| Distilled water | 374.1 g |
| Latex A (solids = 1984.5 g) | 4735.2 g |
| Monomer Premix | |
| Water | 396.9 g |
| Sodium Lauryl Sulfate (10%) | 170.7 g |
| Methyl Methacrylate | 595.4 g |
| Ethyl acrylate | 66.2 g |
| Solution B | |
| Sodium Persulfate | 1.32 g |
| Distilled Water | 132.3 g |

At reaction temperature of 70° C., 54 grams of monomer was added quickly, Solution B was charged and the remainder of the monomer premix was added over about two hours. After one additional hour, the charge was cooled and the product isolated as before. The product was isolated by freeze coagulation. Evaluation is given in Table I.

EXAMPLES 3, 4 and 5

These products were prepared at 70° C. using Latex A as the first stage. The second stage monomer was added as a monomer solution, 20 percent of which was added to the reaction vessel at 70° C. immediately before initiator was added. The remaining monomer was added slowly as was the soap solution. The following recipe was used:

Monomer and soap solution addition time was about 2.5 hours. Temperature was then raised to about 80° C. and held for one-half hour before cooling and isolating the products as before. Evaluation results are in Table I.

EXAMPLE 6

The material was prepared in a six-liter reactor at 30° C. in the same manner as Example 1 using the following recipe:

| | Weight |
|---|---|
| Solution A: | |
| Sodium Lauryl Sulfate (10%) | 260 g |
| Distilled Water | 1872 g |
| Sodium Sulfate | 1.3 g |
| Solution B: | |
| Sodium Formaldehyde Sulfoxylate (SFS) | 0.11 g |
| Distilled Water | 26 g |
| Premix #1: | |
| Distilled Water | 1071.7 g |
| Sodium Lauryl Sulfate (10%) | 109.2 g |
| 2-Ethylhexyl Acrylate | 1950 |
| Sodium Formaldehyde Sulfoxylate | 1.09 g |
| Premix #2 | |
| Sodium Lauryl Sulfate (10%) | 46.8 g |
| Distilled Water | 436.8 g |
| Methyl Methacrylate | 585 g |
| Ethyl Acrylate | 65 g |
| Sodium Formaldehyde Sulfoxylate | 0.52 g |
| Initiator cumene hydroperoxide (82.5%) | 2.5 g |

At reaction temperature, 5 percent of Premix #1 was added to the reactor containing Solution A, the cumene hydroperoxide and Solution B were added as were the remaining ingredients at 30° C. as in Example 1. The product was isolated as before.

EXAMPLE 7

Example 7 was prepared in a subsequent fashion using Latex B prepared at 50° C. in the manner of Latex A using the following recipe:

PREPARATION OF LATEX B

| Preparation of Latex B | |
|---|---|
| | PHM |
| Reactor Charge | |
| Soft Water | 118.2 |
| Sodium Tetradecyl Sulfate | 0.9 |
| 2-Ethylhexyl Acrylate | 20.0 |

-continued

| Preparation of Latex B | |
|---|---|
| | PHM |
| Penwalt 4P | 0.19 |
| Initiator | |
| Sequestrene NaFe | 0.0015 |
| Sequestrene Na3T | 0.01 |
| Sodium Formaldehyde Sulfoxylate | 0.25 |
| Cumene Hydroperoxide | 0.36 |
| Sodium Hydrosulfite | 0.02 |
| Monomer Premix | |
| Soft Water | 40.0 |
| Sodium Tetradecyl Sulfate | 0.6 |
| Penwalt 4P | 0.75 |
| Sequestrene NaFe | 0.006 |
| 2-Ethylhexyl Acrylate | 80.0 |

Penwalt 4P is a molecular weight modifier of the alkyl mercaptan type. Sequestrene Na3T is tri-sodium ethylenediamine tetraacetate, and the sequestrene NaFe is iron chelated by sequestrene Na3T.

The molecular weight of the low molecular weight rubber was determined by GPC to be molecular weight 39,900 and number average molecular weight 10,800.

Latex B was deaerated and charged to a 2-liter reactor and a second phase polymerization was carried as in Example 2 using the following recipe.

| Reactor Charge | |
|---|---|
| Liquid rubber solids | 565 g |
| Latex B (37.1% polymer) | 1574 g |
| Solution A: | |
| Sodium Persulfate | 0.63 g |
| Water | 63 g |
| Premix #1 | |
| Methyl methacrylate | 283 g |
| Ethylacrylate | 31.5 g |
| Water | 189 g |
| Sodium Lauryl Sulfate | 8.3 g |

TEST SAMPLE PREPARATION

The impact modifiers were blended with an aromatic polycarbonate. A low molecular weight polycarbonate resin, Calibre 300-10 from Dow Chemical Company, or Lexan 141 from General Electric Co. was used. The granules of polycarbonate were dried at 120° C. for a minimum of four hours prior to mixing.

The modifiers were added at various levels such as 2.5 percent, 5.0 percent, 7.5 percent, 10 percent and the like, and the Examples relate to a 5.0 percent level. However, notable improvement with regard to notched Izod impact values were obtained in comparison to the control although only the 5.0 percent level is reported herein for purposes of brevity. The impact modifiers were mixed with the polycarbonate using a Gelimat Mixer (Gl-s type, Werner & Pfleiderer Corp., Ramsey, NJ). The mixer conditions were as follows: dumping temperature at 200° C., 6,000 rpm, torque value of 110-125 percent, residence time at 10 to 12 seconds. One batch-size was about 250 grams. The blended semi-molten dough was further blended using a two-roller (25.4 cm diameter) mill maintained at 200° C. for 1.0 to about 1.5 minutes.

Test specimens of 6.35×12.7×127.0 mm were injection molded. An Arburg injection molding machine 220#, Hydronica Allrounder, 40 ton, 2.2 oz. shot size (Polymer Machinery, Berlin, CT) was used. A hopper dryer (Novatec, Model MD-25A) was maintained at 100° C. and was attached to the injection molding machine to prevent moisture pick-up during operation. The nozzle temperature was set at 275°-285° C. and barrel temperatures at 285°-295° C., 275°-285° C., and 265°-275° C. for the first, second and third zone, respectively.

Izod impact test specimen with dimensions of 6.35×12.7×63.5 mm were notched according to the ASTM procedure, D-256, from the above injection molded specimens using a two-blade notching machine. Izod impact testing was carried out according to the Method A of ASTM Procedure D-256.

Results of notched Izod test impact values with regard to Examples 1 through 7 are given in Table I.

TABLE I

| | | Notched Izod (¼" Thick) (J/m$^2$) | | |
|---|---|---|---|---|
| | | Test Temperature | | |
| Ex. No. | Parts | 23° C. | 0° C. | −40° C. |
| 1 | 5 | 790 | 715 | 51 |
| 2 | 5 | 724 | 635 | 137 |
| 3 | 5 | 739 | 631 | 181 |
| 4 | 5 | 762 | 674 | 75 |
| 5 | 5 | 784 | 681 | 107 |
| 6 | 5 | 737 | 678 | 146 |
| 7* | 5 | 228 | 187 | NA |
| Control | 0 | 123 | 127 | 34 |

*Low Molecular Weight Core.

As apparent from Table II, good results were obtained from a variety of conditions as opposed to the control. That is, very large improvements in the impact strength were obtained. Similarly, very large impact improvements were obtained in comparison with Example 7, a shell-core impact modifier made in accordance with U.S. Pat. No. 4,086,296.

While in accordance with the Patent Statutes, the best mode and preferred embodiment have been set forth, the scope of the invention is not limited thereto, but rather by the scope of the attached claims.

What is claimed is:

1. A polycarbonate composition having improved impact resistance, comprising:
a polycarbonate and a multiple-phase impact modifier, free of any grafting or crosslinking agents, said impact modifier containing at least an elastomer phase and a plastic polymer phase, wherein said elastomer has a glass transition temperature of 0° C. or less, said elastomer phase containing one or more polymers made from an alkyl acrylate having the formula

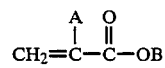

wherein A is hydrogen or an alkyl having from 1 to 3 carbon atoms, and B is an alkyl portion having from 1 to 18 carbon atoms, the number average molecular weight as determined by gel permeation chromatography of said elastomer being at least 100,000, and wherein the amount of said multiple-phase impact modifier is from about 1 part to about 30 parts by weight for every 100 parts by weight of said polycarbonate.

2. A polycarbonate composition having improved impact resistance according to claim 1, wherein the amount of said elastomer is from about 50 percent to about 95 percent by weight based upon the total weight of said impact modifier, wherein the amount of said plastic polymer is from about 5 percent to about 50 percent by weight based upon the total weight of said impact modifier, wherein said plastic polymer is made from a monomer of an alkyl methacrylate wherein said alkyl portion has from 1 to 4 carbon atoms, a vinyl substituted aromatic having from 8 to 12 carbon atoms, or an aliphatic nitrogen compound, or combinations thereof.

3. A polycarbonate composition having improved impact resistance according to claim 2, wherein said plastic polymer has a glass transition temperature of at least 10° C., wherein said aliphatic nitrogen monomer forming said plastic polymer is an acrylonitrile, or a methacrylonitrile, or combinations thereof, and wherein the particle size of said multiple-phase impact modifier is from about 30 to about 400 nanometers.

4. A polycarbonate composition having improved impact resistance according to claim 3, wherein said elastomer has a number average molecular weight as determined by gel permeation chromatography of from about 100,000 to about 7,000,000, wherein said B alkyl portion of said alkyl acrylate is from about 2 to about 12 carbon atoms, wherein A of said alkyl acrylate is hydrogen or methyl, wherein the amount of said elastomer is from about 60 to about 90 percent by weight based upon the total weight of said impact modifier, and wherein the amount of said plastic polymer is from about 10 percent to about 40 percent by weight based upon the total weight of said impact modifier.

5. A polycarbonate composition having improved impact resistance according to claim 4, wherein said glass transition temperature of said plastic polymer is at least 30° C., wherein said elastomer has a glass transition temperature of minus 20° C. of less, and wherein the particle size of said impact modifier is from about 50 to about 300 nanometers.

6. A polycarbonate composition having improved impact resistance according to claim 5, wherein said elastomer is made from 2-ethylhexyl acrylate, wherein the number average molecular weight of said elastomer as determined by gel permeation chromatography is from about 200,000 to about 5,000,000, and wherein said plastic polymer is made from monomers of methyl methacrylate, styrene, acrylonitrile, or methacrylonitrile, or combinations thereof, and wherein the amount of said multiple-phase impact modifier is from about 2 to about 10 parts by weight per 100 parts by weight of said polycarbonate.

7. A polycarbonate composition having improved impact resistance according to claim 2, wherein said plastic polymer has a glass transition temperature of at least 50° C., including a property improving comonomer, wherein said property improving comonomer is an alkoxy substituted alkyl acrylate, an alkyl acrylate, a vinyl ether, a vinyl ester, an alkyl acrylamide, an aryl acrylate, or an aryl methacrylate, or combinations thereof.

8. A polycarbonate composition having improved impact resistance according to claim 4, wherein said plastic polymer is also made from a property improving comonomer, wherein said property improving comonomer is an alkoxy substituted alkyl acrylate having from 1 to 8 carbon atoms, an alkyl acrylate having from 1 to 8 carbon atoms, a vinyl ether having from 1 to 12 carbon atoms, a vinyl ester having from 1 to 12 carbon atoms, an alkyl acrylamide having from 1 to 12 carbon atoms, an aryl acrylate having from 6 to 16 carbon atoms, or an aryl methacrylate having from 6 to 16 carbon atoms, or combinations thereof, and wherein the amount of said property improving monomers is from about 2 percent to about 30 percent by weight based upon the total weight of said plastic polymer forming monomers.

9. A polycarbonate composition having improved impact resistance according to claim 6, wherein said plastic polymer is also made from a property improving comonomer, wherein the amount of said property improving comonomer is from about 2 percent to about 30 percent by weight based upon the total weight of said plastic polymer forming monomers, and wherein said property improving comonomer is an alkoxy substituted alkyl acrylate having from 1 to 8 carbon atoms, an alkyl acrylate having from 1 to 8 carbon atoms, a vinyl ether having from 1 to 12 carbon atoms, a vinyl ester having from 1 to 12 carbon atoms, an alkyl acrylamide having from 1 to 12 carbon atoms, an aryl acrylate having from 6 to 16 carbon atoms, or an aryl methacrylate having from 6 to 16 carbon atoms, or combinations thereof.

10. A polycarbonate composition having improved impact resistance according to claim 1, including an elastomer-forming comonomer of styrene, acrylonitrile, and combinations thereof, the amount of said comonomer being up to about 25 percent by weight based upon the total weight of said elastomer-forming comonomer and said alkyl acrylate.

11. A polycarbonate composition having improved impact resistance according to claim 3, including an elastomer-forming comonomer of styrene, acrylonitrile, and combinations thereof, the amount of said comonomer being up to about 15 percent by weight based upon the total weight of said elastomer-forming comonomer and said alkyl acrylate.

12. A polycarbonate composition having improved impact resistance according to claim 6, including an elastomer-forming comonomer of styrene, acrylonitrile, and combinations thereof, the amount of said comonomer being up to about 15 percent by weight based upon the total weight of said elastomer-forming comonomer and said alkyl acrylate.

13. A polycarbonate composition having improved impact resistance according to claim 10, wherein up to 50 percent by weight of said plastic polymer is made from one or more property improving comonomers.

14. A polycarbonate composition having improved impact resistance according to claim 11, wherein up to about 50 percent by weight of said plastic polymer is made from one or more property improving comonomers, and wherein said property improving comonomer is an alkoxy substituted alkyl acrylate, an alkyl acrylate, a vinyl ether, a vinyl ester, an alkyl acrylamide, an aryl acrylate, or an aryl methacrylate, or combinations thereof.

15. A polycarbonate composition having improved impact resistance according to claim 13, wherein from about 2 percent to about 30 percent by weight of said plastic polymer is made from one or more property improving comonomers, wherein said property improving comonomer is an alkoxy substituted alkyl acrylate having from 1 to 8 carbon atoms, an alkyl acrylate having from 1 to 8 carbon atoms, a vinyl ether having from 1 to 12 carbon atoms, a vinyl ester having from 1 to 12 carbon atoms, an alkyl acrylamide having from 1 to 12 carbon atoms, an aryl acrylate having from 6 to 16 carbon atoms, or an aryl methacrylate having from 6 to 16 carbon atoms, or combinations thereof.

* * * * *